(12) United States Patent
Watanabe et al.

(10) Patent No.: US 7,311,983 B2
(45) Date of Patent: Dec. 25, 2007

(54) PERPENDICULAR MAGNETIC RECORDING MEDIUM AND A METHOD FOR MANUFACTURING THE SAME

(75) Inventors: Sadayuki Watanabe, Nagano (JP); Yasushi Sakai, Nagano (JP); Hiroyuki Uwazumi, Nagano (JP)

(73) Assignee: Fuji Electric Device Technology Co., Ltd., jpx ( * ) Notice: Subject to any disclaimer, the term of this patent is extended or adjusted under 35 U.S.C. 154(b) by 69 days.

(21) Appl. No.: 10/867,568

(22) Filed: Jun. 14, 2004

(65) Prior Publication Data
US 2005/0153169 A1   Jul. 14, 2005

(30) Foreign Application Priority Data
Jan. 8, 2004   (JP) ............................. 2004-003365

(51) Int. Cl.
G11B 5/66 (2006.01)
(52) U.S. Cl. ................. 428/829; 428/836.2; 428/836.3; 204/192.2
(58) Field of Classification Search .................... None
See application file for complete search history.

(56) References Cited

U.S. PATENT DOCUMENTS

| | | | | |
|---|---|---|---|---|
| 5,679,473 | A | 10/1997 | Murayama et al. | 428/694 |
| 6,830,824 | B2 * | 12/2004 | Kikitsu et al. | 428/828.1 |
| 2003/0138671 | A1 * | 7/2003 | Oikawa et al. | 428/695 |
| 2004/0185308 | A1 * | 9/2004 | Koda et al. | 428/694 TS |
| 2004/0247941 | A1 * | 12/2004 | Chen et al. | 428/694 T |
| 2006/0204791 | A1 * | 9/2006 | Sakawaki et al. | 428/828.1 |
| 2006/0246323 | A1 * | 11/2006 | Liu et al. | 428/829 |

FOREIGN PATENT DOCUMENTS

| | | |
|---|---|---|
| JP | 2000-306228 A | 11/2000 |
| JP | 2000-311329 A | 11/2000 |
| JP | 2001-101651 A | 4/2001 |
| JP | 2002-230735 A | 8/2002 |
| JP | 2002-358615 A | 12/2002 |
| JP | 2003-77113 A | 3/2003 |
| JP | 2003-168207 A | 6/2003 |
| JP | 2003-317221 A | 11/2003 |

OTHER PUBLICATIONS

Derwent Abstract Translation of WO 2004-090874 A1 (Derwent Acc No: 2004-758135).*
T. Oikawa et al.; "Microstructure and Magnetic Properties of CoPtCr-SiO$_2$ Perpendicular Recording Media", IEEE Transactions on Magnetics, vol. 38, No. 5; Sep. 2002; pp. 1976-1978.

* cited by examiner

*Primary Examiner*—Kevin M. Bernatz
(74) *Attorney, Agent, or Firm*—Rossi, Kimms & McDowell, LLP

(57) ABSTRACT

A perpendicular magnetic recording medium has a magnetic recording layer and laminated magnetic layers composed of different materials. In a first magnetic layer of the magnetic recording layer, ferromagnetic grains are surrounded by a nonmagnetic grain boundary region composed principally of oxide and/or nitride. In a second magnetic layer of the magnetic recording layer, ferromagnetic grains are surrounded by a nonmagnetic grain boundary region composed principally of chromium. The recording medium has an intermediate layer composed of a material having hcp or fcc structure. Advantageously, a heating process is conducted after forming the first magnetic layer and before forming the second magnetic layer. The medium achieves improvement in electromagnetic conversion characteristics and simultaneously improvement in corrosion resistance to provide a perpendicular magnetic recording medium with high recording density and simultaneously high reliability.

23 Claims, 8 Drawing Sheets

PERPENDICULAR MAGNETIC RECORDING MEDIUM AND A METHOD FOR MANUFACTURING THE SAME

CROSS REFERENCE TO RELATED APPLICATIONS

This application claims priority from Japanese application Serial No. 2004-003365, filed on Jan. 8, 2004, and the contents of this document are incorporated herein by reference in their entirety.

BACKGROUND OF THE INVENTION

A. Field of the Invention

The present invention relates to a perpendicular magnetic recording medium mounted on various magnetic recording apparatuses, and to a manufacturing method therefor.

B. Description of the Related Art

A perpendicular magnetic recording system in which recording magnetization is perpendicular to a medium surface is being explored as a technology for achieving higher density in magnetic recording than that achieved by conventional longitudinal magnetic recording systems.

A perpendicular magnetic recording medium is mainly composed of a magnetic recording layer of hard magnetic material, an intermediate layer for aligning the magnetic recording layer to a specified orientation, a protective layer for protecting a surface of the magnetic recording layer, and a backlining layer of soft magnetic material. The backlining layer concentrates magnetic flux generated by a magnetic head for recording on the recording layer. The soft magnetic backlining layer can enhance performance of a medium, but can be omitted since recording is possible without a backlining layer.

To achieve high recording density in a perpendicular recording medium, low noise compatible with high thermal stability is required as in a longitudinal recording medium.

In the field of longitudinal magnetic recording media, various compositions and structures of the magnetic recording layer and materials for the nonmagnetic intermediate layer have been proposed to date. Practically used magnetic recording layers employ an alloy composed mainly of cobalt and chromium (hereinafter referred to as a CoCr alloy). The chromium segregates to a grain boundary region and becomes a principal component of the grain boundary region to obtain magnetically isolated magnetic grains. Another magnetic recording layer is proposed in which the principal component of the grain boundary region is oxide or nitride. (See U.S. Pat. No. 5,679,473 and Japanese Unexamined Patent Application Publication No. 2001-101651.)

The above-mentioned magnetic materials in longitudinal magnetic recording media can also be applied to perpendicular magnetic recording media by, for example, providing an intermediate layer that controls crystal orientation to achieve perpendicular magnetic anisotropy. Reduction of magnetic interaction between magnetic grains also is a problem in attaining high recording density in perpendicular magnetic recording media.

An example using a CoCr alloy is disclosed in Japanese Unexamined Patent Application Publication No. 2002-358615. The magnetic recording layer in the reference uses CoCrPt—X, and the chromium concentration is higher in the grain boundary region than in the crystalline grains, obtaining a segregation structure.

Examples using oxide or nitride as the principal component in the grain boundary region are disclosed in Japanese Unexamined Patent Application Publication Nos. 2000-306228 and 2000-311329.

A segregation structure is obtained by heat treatment in the references. Drastic reduction of media noise in this type of recording layer, in comparison with a magnetic recording layer that uses a conventional CoCr alloy with a principal component of chromium in the grain boundary region, is disclosed in a reference: T. Oikawa et al., *IEEE Trans. Magn.*, September 2002, vol. 38, No. 5, pp. 1976-1978, "Microstructure and Magnetic Properties of CoPtCr—SiO2 Perpendicular Recording Media".

Perpendicular magnetic recording media recently have been proposed in which a magnetic recording layer is constructed with a multiple of function-separated layers to achieve not only a reduction in media noise, but also a high thermal stability. Japanese Unexamined Patent Application Publication No. 2002-230735 discloses a multi-layered structure of CoCrPt alloy layers containing chromium and platinum with concentrations that differ from layer to layer. Japanese Unexamined Patent Application Publication No. 2003-077133 discloses a multi-layered structure including a granular magnetic layer and an amorphous magnetic layer without a grain boundary. Here, the granular structure is a material structure in which ferromagnetic crystalline grains are surrounded by a nonmagnetic grain boundary region principally composed of oxide and/or nitride.

In magnetic recording devices equipped with a flying magnetic head, a distance between the magnetic head and the magnetic recording medium is a very small value of several tens of nanometers. Durability of this type of device is strongly affected by friction and wear characteristics between the head and the medium. To improve the friction and wear characteristics of the medium, the medium surface generally is coated with a liquid lubricant having a molecular weight of several thousands. It is known that precipitation of cobalt atoms contained in the magnetic layer of the medium to the medium surface promotes decomposition of the liquid lubricant on the medium surface, resulting in a substantial degradation of durability of the medium. To avoid the precipitation of cobalt, it is necessary to control thickness and quality of a protective film and surface roughness of a medium surface.

Studies by the inventors of the present invention, however, revealed that cobalt atoms contained in the magnetic layer readily precipitate to the medium surface in a magnetic layer having a granular structure. A magnetic layer having a granular structure is referred to as a granular magnetic layer. The cobalt precipitation is significant particularly when argon gas pressure in the sputtering deposition process is increased for achieving excellent magnetic properties and electromagnetic conversion performance. If the cobalt atoms precipitate to the medium surface, the cobalt atoms promote decomposition of the liquid lubricant molecules on the medium surface, creating a problem of substantial degradation of durability against friction and wear of the medium.

The present invention is directed to overcoming or at least reducing the effects of one or more of the problems set forth above.

SUMMARY OF THE INVENTION

The present invention has been accomplished in view of the above problems and an object of the invention is to provide a perpendicular magnetic recording medium in which cobalt precipitation is suppressed from the magnetic layer having a granular structure, achieving excellent recording performance and durability, as well as high productivity.

An aspect of the present invention is a perpendicular-magnetic recording medium comprising a nonmagnetic substrate and layers sequentially laminated on the substrate. The layers comprise an intermediate layer, a magnetic recording layer, and a protective layer. The magnetic recording layer is a lamination of two magnetic layers that differ in material. A first magnetic layer on the intermediate layer has a granular structure, and a second magnetic layer provided on the first magnetic layer has a structure consisting of ferromagnetic grains and nonmagnetic grain boundary region that includes neither oxide nor nitride. Hereinafter, this latter structure is referred to as non-granular structure.

The first magnetic layer secures favorable electromagnetic characteristic by virtue of its granular structure, while the second magnetic layer secures high durability of a medium by blocking cobalt atoms from precipitating through the nonmagnetic grain boundary region of the first magnetic layer. As a result, a recording medium of the invention exhibits an excellent magnetic property and electromagnetic conversion characteristic. The amount of cobalt precipitation extracted by shaking a medium in 50 ml of pure water for 3 minutes and measured by ICP emission spectroscopic analysis has been demonstrated to be less than 1 ng per 1 $cm^2$ of disk area after leaving the medium in an environment of high temperature and humidity of 85° C. and 80% RH. Thus, satisfactorily long term reliability has been achieved.

The ferromagnetic grains in the first magnetic layer contain cobalt as a principal component and additionally platinum or chromium. The ferromagnetic grains in the first magnetic layer preferably further contain an element selected from Ni, Ta, B, Nb, Ag, Mo, W, Pd, and Cu. The nonmagnetic grain boundary region in the first magnetic layer is preferably composed of oxide or nitride of at least an element selected from Cr, Co, Al, Ti, Si, Ta, Hf, Zr, Y, and Ce.

In the second magnetic layer, ferromagnetic grains contain a CoCr alloy as a principal component and preferably further contain at least an element selected from Pt, Ta, B, Nb, Ag, Mo, W, Pd, and Cu. The magnetic grain boundary region in the second magnetic layer contains a non-ferromagnetic component of chromium. Concentration of the chromium in the grain boundary region is higher than concentration of chromium in the ferromagnetic grains.

In a particularly favorable structure, a first magnetic layer consists of ferromagnetic grains composed of CoPtCr and nonmagnetic grain boundary region composed of $SiO_2$, and a second magnetic layer consists of ferromagnetic grains of CoCrPtB and grain boundary region containing chromium in a concentration higher than a concentration of chromium in the ferromagnetic grains.

An intermediate layer, which favorably controls crystal alignment, grain size, and grain boundary segregation of the first magnetic layer, can be composed of a material having an hcp structure or an fcc structure. Preferable materials having the hcp structure includes Ti, Re, Ru, Os, Zr, Zn, and Tc, and alloys containing at least an element selected from Ti, Re, Ru, Os, Zr, Zn, and Tc. Preferable materials having the fcc structure includes Cu, Rh, Pd, Ag, Ir, Pt, Au, Ni, and Co, and alloys containing at least an element selected from Cu, Rh, Pd, Ag, Ir, Pt, Au, Ni, and Co.

A seed layer can be further provided beneath the intermediate layer. The seed layer can be composed of a NiFe alloy or a NiFe alloy that contains at least an additive element selected from B, Si, Nb, and Mo. The seed layer can also be composed of cobalt or a cobalt alloy that contains at least an additive element selected from B, Si, Nb, Mo, Fe, and Ni.

A soft magnetic backlining layer can be further provided between the substrate and the intermediate layer or between the substrate and the seed layer.

An underlayer consisting of one or more layers and a magnetic domain control layer can be further provided between the substrate and the soft magnetic backlining layer. The underlayer and the magnetic domain control layer remarkably suppress spike noises due to the soft magnetic backlining layer.

Another aspect of the present invention is a method for manufacturing a perpendicular magnetic recording medium. The method of the invention comprises steps of preparing a nonmagnetic substrate without a preheating process, depositing an intermediate layer on the substrate, depositing a first magnetic layer having a granular structure on the intermediate layer by a sputtering method, depositing a second magnetic layer having a non-granular structure on the first magnetic layer by a sputtering method, and depositing a protective layer on the second magnetic layer. A gas pressure in the step of depositing the first magnetic layer is 10 mTorr or more, and a gas pressure in the step of depositing the second magnetic payer is 15 mTorr or less. By controlling the gas pressures in the depositing steps in these ranges, cobalt precipitation from a granular structure is suppressed to achieve excellent electromagnetic conversion characteristic and satisfactory durability simultaneously.

A further aspect of the invention is a method for manufacturing a magnetic recording layer which comprises steps of preparing a nonmagnetic substrate without a preheating process, depositing an intermediate layer on the substrate, depositing a first magnetic layer having a granular structure on the intermediate layer by a sputtering method, heating the substrate having the first magnetic layer formed thereon subsequent to the step of forming the first magnetic layer, depositing a second magnetic layer having a non-granular structure on the first magnetic layer by a sputtering method, and depositing a protective layer on the second magnetic layer.

Because a heating step is inserted after the step of forming the first magnetic layer and before the step of forming the second magnetic layer, the second magnetic layer grows while retaining the same grain size and same grain boundary width as those of the first magnetic layer. Segregation of the nonmagnetic element in the nonmagnetic grain boundary region in the second magnetic layer is drastically promoted when this intermediate heating is used as compared to the use of post heating that is conducted after deposition of both first and second magnetic layers. This improves electromagnetic conversion characteristic and at the same time enhances corrosion resistance. Therefore, both high recording density and high reliability are achieved in a perpendicular magnetic recording medium of the invention.

BRIEF DESCRIPTION OF THE DRAWINGS

The foregoing advantages and features of the invention will become apparent upon reference to the following detailed description and the accompanying drawings.

DETAILED DESCRIPTION OF SPECIFIC EMBODIMENTS

Some preferred embodiments of the present invention will be described with reference to accompanying drawings in the following.

Figure 1:
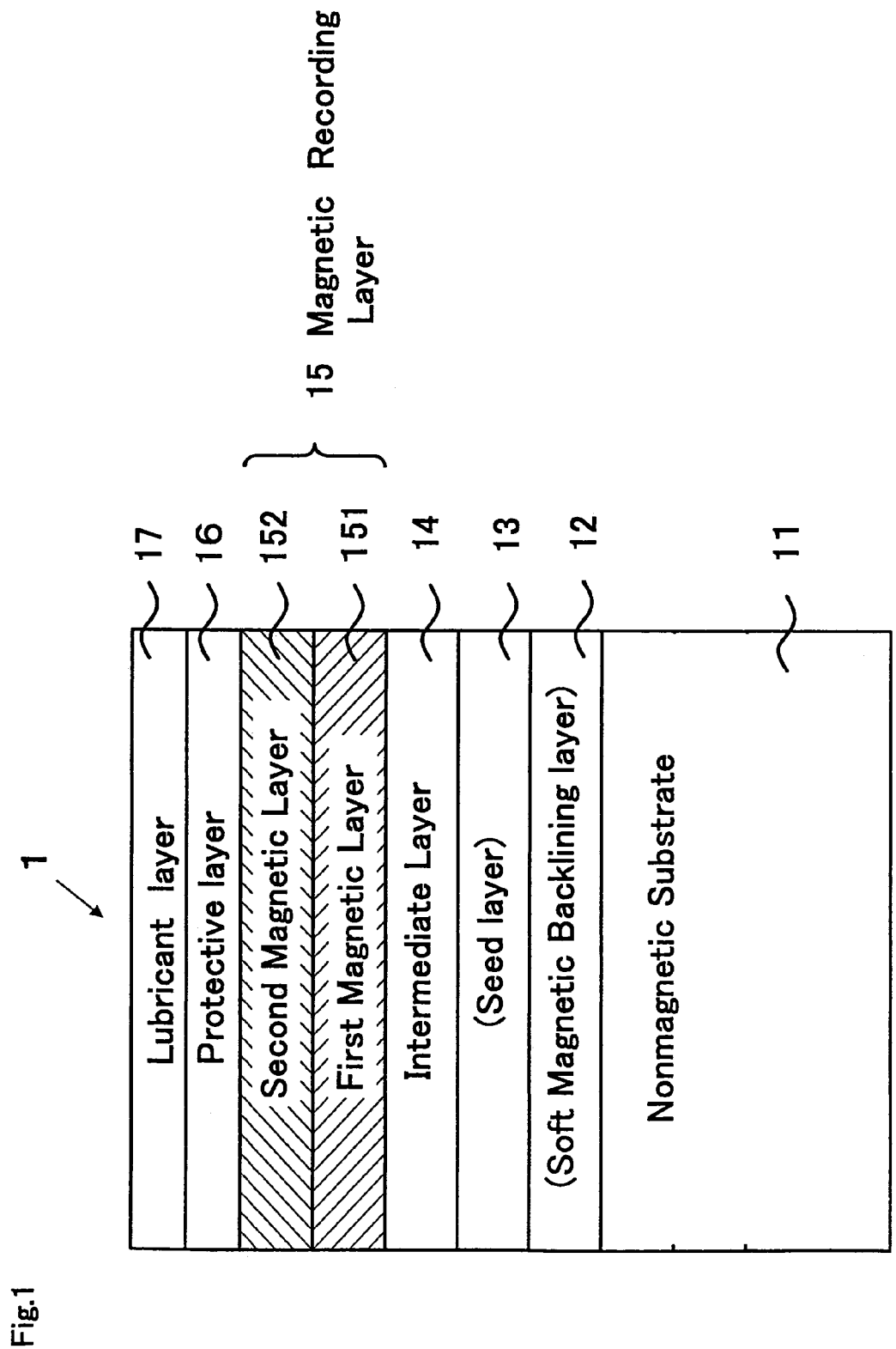
FIG. 1 is a sectional view of a first exemplary structure of an embodiment of a perpendicular magnetic recording medium according to the present invention.

FIG. 1 is a sectional view of a first exemplary structure of an embodiment of a perpendicular magnetic recording medium according to the present invention. Referring to FIG. 1, the perpendicular magnetic recording medium comprises nonmagnetic substrate 11, and layers sequentially formed on the substrate, the layers including soft magnetic backlining layer 12, seed layer 13, intermediate layer 14, magnetic recording layer 15, and protective layer 16. Lubricant layer 17 is further formed on protective layer 16. Magnetic recording layer 15 consists of first magnetic layer 151 and second magnetic layer 152.

Figure 2:
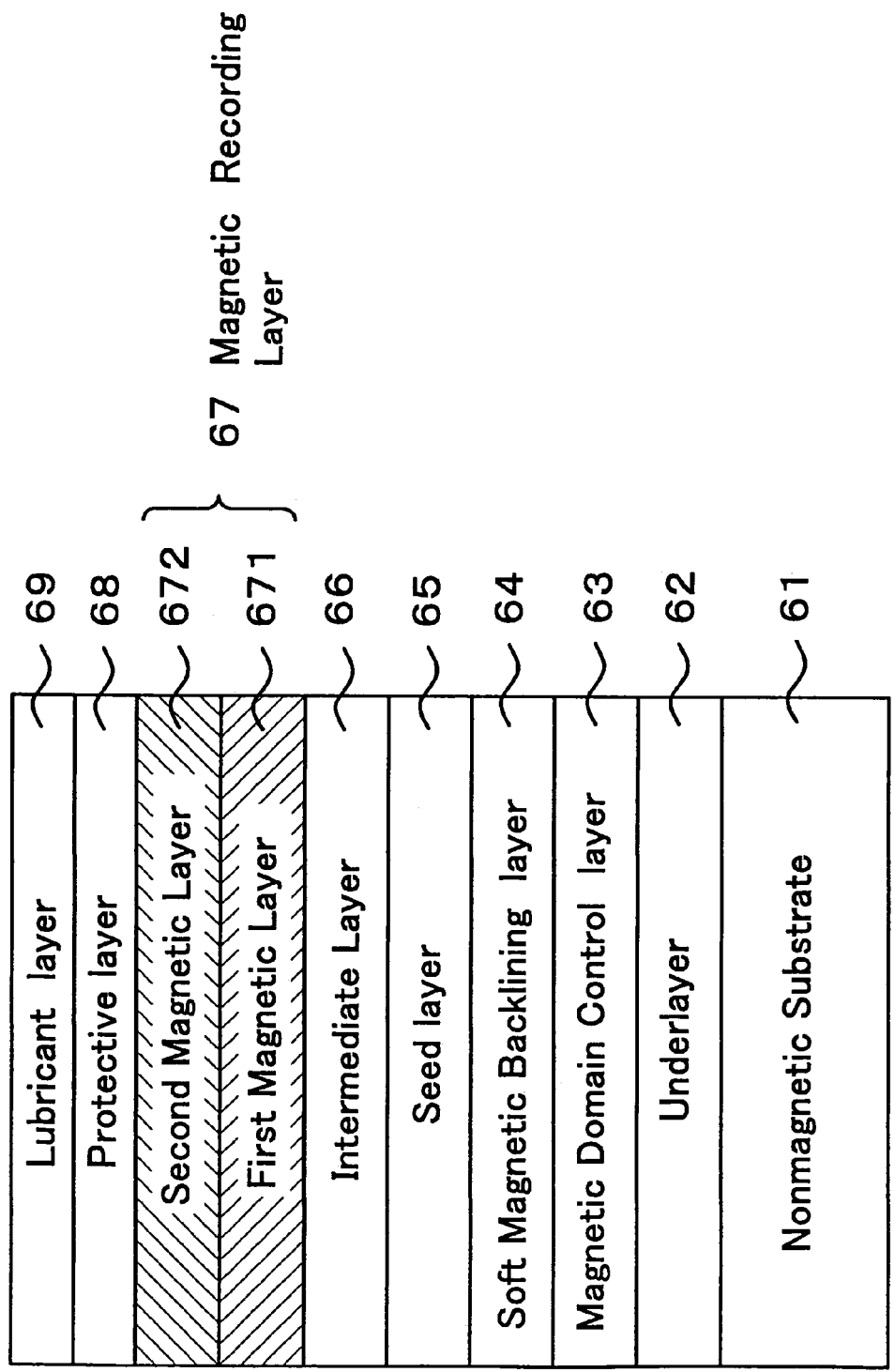
FIG. 2 is a sectional view of a second exemplary structure of an embodiment of a perpendicular magnetic recording medium according to the present invention.

FIG. 2 is a sectional view of a second exemplary structure of an embodiment of a perpendicular magnetic recording medium according to the present invention. Referring to FIG. 2, the perpendicular magnetic recording medium comprises nonmagnetic substrate 61, and layers sequentially formed on the substrate, the layers including multi-layered underlayer 62, magnetic domain control layer 63, soft magnetic backlining layer 64, seed layer 65, intermediate layer 66, magnetic recording layer 67, and protective layer 68. Lubricant layer 69 is further formed on protective layer 68. Magnetic recording layer 67 consists of first magnetic layer 671 and second magnetic layer 672.

Nonmagnetic substrate 11, 61 in a perpendicular magnetic recording medium of the invention can be made of a Ni—P plated aluminum alloy, strengthened glass, or crystallized glass. Soft magnetic backlining layer 12, 64 preferably is provided for controlling magnetic flux generated by a magnetic head used for magnetic recording, thereby improving recording performance. The soft magnetic backlining layer may be omitted. While the soft magnetic backlining layer can be made of a crystalline alloy such as an NiFe alloy, a Sendust (FeSiAl) alloy, or a CoFe alloy, or a fine crystalline material such as FeTaC, CoTaZr, CoFeNi, or CoNiP, better electromagnetic conversion characteristics can be obtained by using an amorphous cobalt alloy such as CoNbZr or CoTaZr. An optimum thickness of backlining layer 12, 64 varies depending on the structure and characteristics of the magnetic head used for magnetic recording. When the soft magnetic backlining layer is formed in sequential depositions of other layers, the preferable thickness is in a range of about 10 nm to 500 nm considering productivity. In the case of preliminary deposition by plating on a nonmagnetic substrate before deposition of other layers, the thickness may be as thick as several microns.

Magnetic domain control layer 63 is preferably provided for controlling magnetic domains of the soft magnetic backlining layer and suppressing spike noises generated in the soft magnetic backlining layer. The magnetic domain control layer may be omitted. The magnetic domain control layer can be composed of an antiferromagnetic film of a manganese-containing alloy of PtMn or IrMn, or a hard magnetic film of CoCrTa, CoCrPt, or CoCrPtB in which magnetization is oriented in a radial direction of the substrate. Thickness of the magnetic domain control layer is preferably in a range of about 5 to 300 nm.

Underlayer 62 is preferably provided for controlling crystal orientation and grain size of the magnetic domain control layer. A multilayered structure is preferable in the underlayer. The underlayer may be omitted. When magnetic domain control layer 63 is composed of an antiferromagnetic film of manganese-based alloy, the underlayer is preferably composed of a nonmagnetic metal having and fcc structure such as Cu or Ir, or composed of a nonmagnetic alloy such as NiFeCr. In this case, a layer of Ta, Zr, or Nb that is 3 to 30 nm thick may be further provided under the nonmagnetic metal film or the nonmagnetic alloy film for controlling fine structure of this film. When magnetic domain control layer 63 is composed of a hard magnetic film, the underlayer can be composed of a chromium alloy such as CrMo or CrW. In this case, a layer may be further provided under the chromium alloy film for controlling fine structure of the chromium alloy film. Underlayer 62 is not necessarily composed of a plurality of layers, but can be a single layer if desired.

Intermediate layer 14, 66 is provided for favorably controlling crystal orientation, grain size, and grain boundary segregation of first magnetic layer 151, 671. The intermediate layer is preferably composed of a metal or alloy having an hcp structure or a metal or alloy having an fcc structure. From the view point of controlling crystal orientation of first magnetic layer 151, 671, a preferable material for the intermediate layer is selected from metals with an hcp structure, including Ti, Re, Ru, Os, Zr, Zn, and Tc, or from alloys with an hcp structure that contain at least one metal selected from Ti, Re, Ru, Os, Zr, Zn, and Tc. The metal having an fcc structure for the intermediate layer is preferably selected from Cu, Rh, Pd, Ag, Ir, Pt, Au, Ni, and Co. The alloy having an fcc structure for the intermediate layer is preferably selected from alloys containing at least one metal selected from Cu, Rh, Pd, Ag, Ir, Pt, Au, Ni, and Co. Ru, Ir, Pt, Au, and alloys of these metals, in particular, preferably are used, because these metals and alloys scarcely react with oxygen or nitrogen contained in nonmagnetic grain boundary region of first magnetic layer 151, 671 that is described later in detail. Thus, they are unlikely to disturb the crystal orientation of cobalt that is a principal component of ferromagnetic grains in first magnetic layer 151, 671. Thickness of the intermediate layer is desired to be the minimum value required to control crystal structure of first magnetic layer 151, 671 from view points of enhancement of recording resolution and productivity. A thickness of about 3 nm or more is preferable to ensure crystal growth of the intermediate layer itself.

Seed layer 13, 65 is preferably provided directly under the intermediate layer for improving alignment of intermediate layer 14, 66, though it may be omitted. The seed layer can be composed of a nonmagnetic material or a soft magnetic material.

When soft magnetic backlining layer 12, 64 is formed beneath the seed layer, a soft magnetic material is preferable for the seed layer because the material functions partly as a soft magnetic backlining layer.

The soft magnetic material for seed layer 13, 65 can be selected from a nickel-based alloy such as NiFe, NiFeNb, NiFeB, and NiFeCr, and from cobalt and cobalt-based alloys such as CoB, CoSi, CoNi, and CoFe. These materials for the seed layer take preferably fcc or hcp structure as the material for the intermediate layer. The seed layer may consist of plural layers of the above materials, each layer functioning separately to ensure crystalline lattice consistency or to control grain size.

Figure 3:
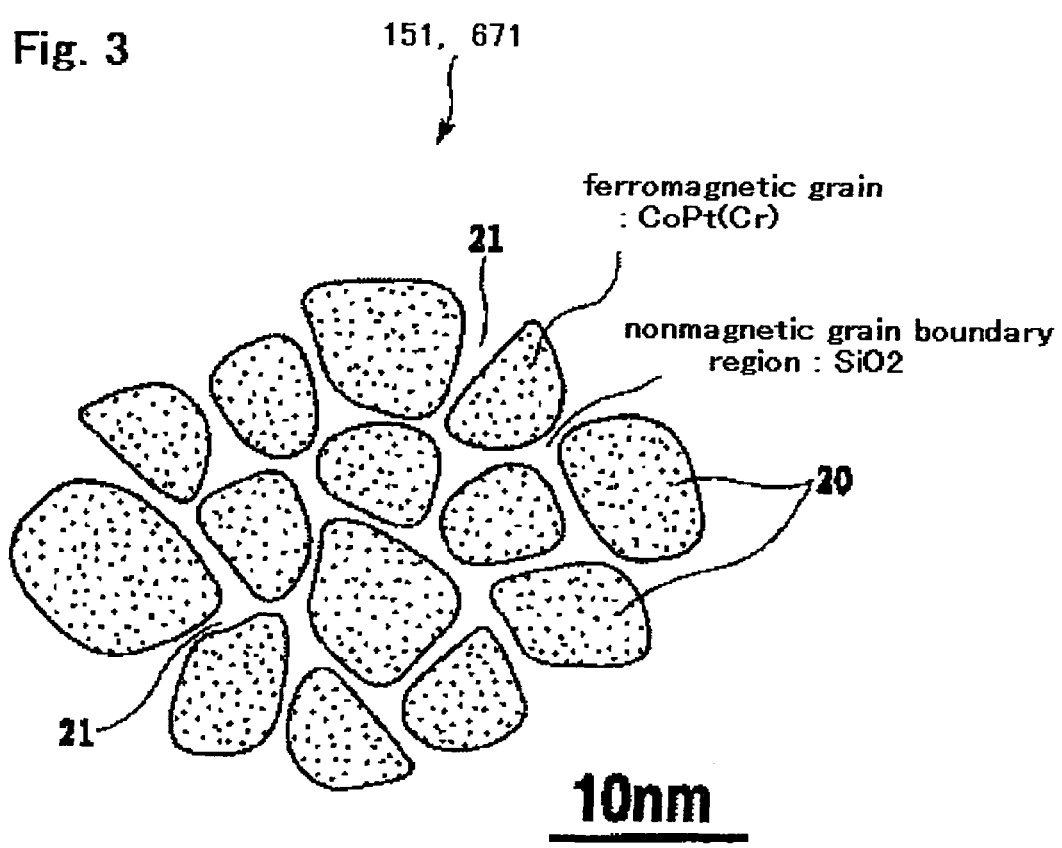
FIG. 3 illustrates a surrounding structure of a first magnetic layer constructing a magnetic recording layer.

Magnetic recording layer 15, 67 is a lamination of plural magnetic layers of different materials: first magnetic layer 151, 671, and second magnetic layer 152, 672. First magnetic layer 151, 671 shown in FIG. 3 has a granular structure in which ferromagnetic grains 20 are surrounded by nonmagnetic grain boundary region 21 of principal component of oxide and/or nitride. Ferromagnetic grains 20 in the first magnetic layer are preferably composed of a principal component of cobalt and contain at least platinum or chromium. Ferromagnetic grains 20 favorably further contain at least one element selected from Ni, Ta, B, Nb, Ag, Mo, W, Pd, and Cu for the purpose of grain size control and crystallinity improvement. Appropriate materials for nonmagnetic grain boundary region 21 of the first magnetic layer includes oxides and/or nitrides of at least one element selected from Cr, Co, Al, Ti, Si, Ta, Hf, Zr, Y, and Ce from a viewpoint of forming stable granular structure.

The first magnetic layer can be formed, for example, by a sputtering method using a target of ferromagnetic metals that contains oxide and/or nitride composing the nonmagnetic grain boundary region. Alternatively, the first magnetic layer can be formed by a reactive sputtering method using a target of ferromagnetic metals in an argon gas atmosphere that contains oxygen and/or nitrogen. To obtain a granular magnetic layer with favorable performance, the gas pressure in the process of depositing the layer needs to be about 10 mTorr or more. Thickness of the first magnetic layer is preferably about 30 nm or less to achieve high recording resolution.

The first magnetic layer can consist of a plurality of layers, as well as a single layer. The multilayered structure of the first magnetic layer may consist of plural layers, each including ferromagnetic grains of different material from in other layers. Or the multilayered structure of the first magnetic layer may consist of plural layers with various ratios between the ferromagnetic grains and the nonmagnetic grain boundary region, by changing the proportion of added oxide or nitride. The multilayered structure allows appropriate adjustment of the balance between signal-to-noise ratio (SNR) and other performances.

Figure 4:
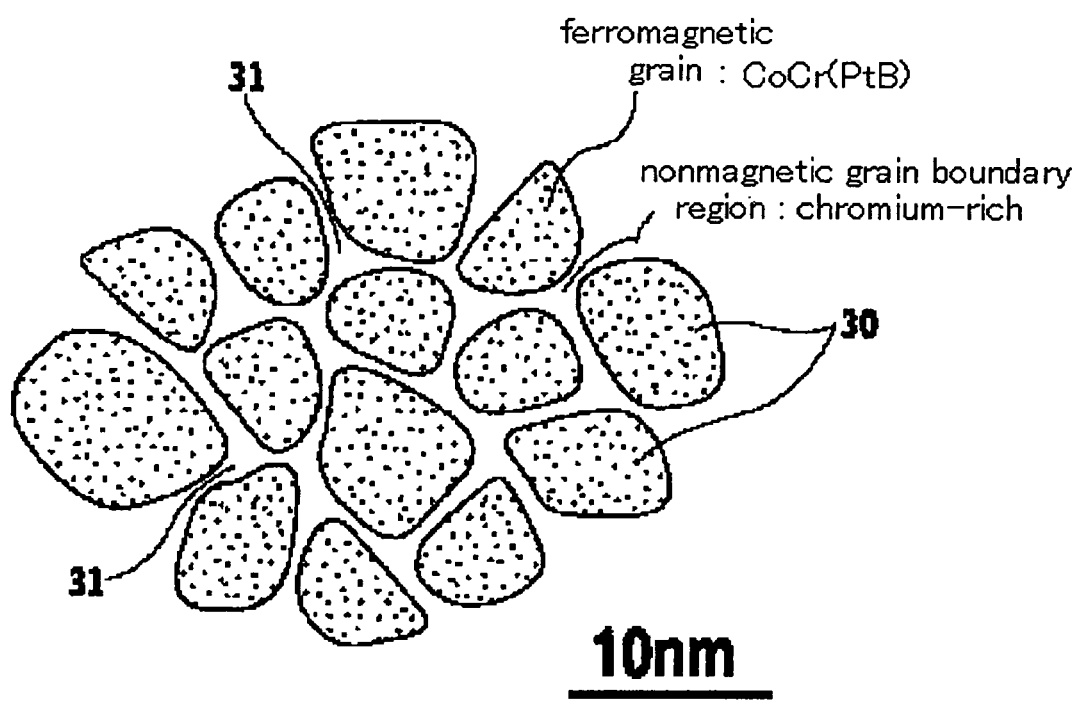
FIG. 4 illustrates a surrounding structure of a second magnetic layer constructing a magnetic recording layer.

Second magnetic layer 152, 672 shown in FIG. 4 has a non-granular structure in which ferromagnetic grains 30 are surrounded by nonmagnetic grain boundary region 31 that contains no oxide and nitride. The absence of oxide and nitride here means that neither oxide nor nitride is contained as a major component, and possibility of inclusion as impurities is not excluded. Ferromagnetic grains 30 in the second magnetic layer are preferably composed of a principal component of cobalt and contain at least chromium. Ferromagnetic grains 30 favorably further contain at least one element selected from Pt, Ta, B, Nb, Ag, Mo, W, Pd, and Cu, in addition to the cobalt and chromium. For example, a favorable material for the ferromagnetic grains can be selected from alloys including CoCr, CoCrTa, CoCrPt, CoCrPtTa, and CoCrPtB. Nonmagnetic grain boundary region 31 in the second magnetic layer contains a non-ferromagnetic component preferably in a concentration higher than a concentration of the same non-ferromagnetic component in ferromagnetic grains 30. In particular, non-magnetic grain boundary region 31 preferably contains a non-ferromagnetic component of chromium and the chromium concentration is higher than a chromium concentration in the ferromagnetic grains.

The second magnetic layer can be formed by a sputtering method. To produce a perpendicular magnetic recording medium exhibiting excellent durability, gas pressure in the process of depositing the second magnetic layer needs to be about 15 mTorr or less. Thickness of the second magnetic layer is preferably about 20 nm or less.

The second magnetic layer can consist of a plurality of layers as well as a single layer. The multilayered structure may consist of plural layers, each including ferromagnetic grains of material that is different from that in the other layers, thereby appropriately adjusting the balance between cobalt precipitation quantity and other performances.

The magnetic recording layer having the above-described structure is preferably subjected to heat treatment during or after the process to deposit the magnetic recording layer. Heat treatment enhances signal-to-noise ratio (SNR) and suppression effect to cobalt precipitation. The effect of heat treatment is significant with a heat treatment during a process to deposit the magnetic recording layer. The heat treatment during deposition process of the magnetic recording layer is preferably conducted after deposition of first magnetic layer 151, 671 and before deposition of second magnetic layer 152, 672. The heat treatment after deposition process of the magnetic recording layer is conducted after deposition of second magnetic layer 152, 672. In the case of the heat treatment after deposition process of the magnetic recording layer, fast cooling after the heating is favorable.

Preferable conditions of heat treatment of the magnetic recording layer are a temperature higher than about 150° C. that produces sufficient effect and a time duration in the range of about 1 second to 10 minutes considering productivity.

Protective layer 16, 68 can be a conventional one, for example, a protective film mainly composed of carbon. Lubricant layer 17, 69 can be made of a conventional material, for example, a liquid lubricant of perfluoropolyether. Thickness and other conditions of protective layer 16, 68 and lubricant layer 17, 69 can be the same as those of the conventional ones.

Specific examples of perpendicular magnetic recording media and manufacturing methods therefor will be described in the following. The examples are merely exemplary perpendicular magnetic recording media and methods for the purpose of illustrating the present invention and the invention shall not be limited to the examples.

EXAMPLE 1

Perpendicular magnetic recording medium 1 as shown in FIG. 1 was produced in Example 1 except that seed layer 13 in FIG. 1 was not provided. Nonmagnetic substrate 11 was a chemically reinforced glass substrate with a smooth surface (for example, N-5 glass substrate made by HOYA Corporation). After cleaning, the substrate was put into a sputtering apparatus. Sequentially deposited layers were amorphous soft magnetic backlining layer 12 of CoZrNb 200 nm thick, intermediate layer 14 of ruthenium with a thickness of 30 nm, first magnetic layer 151 having a thickness of 20 nm deposited by an RF sputtering method using a target of CoCrPt—SiO$_2$, and second magnetic layer 152 having a thickness of 10 nm deposited using a target of CoCrPtB. The first magnetic layer and the second magnetic layer were formed in various conditions of sputtering gas pressures in Example 1. After depositing protective layer 16 of carbon 5 nm thick, the substrate was taken out from the vacuum chamber. Finally, liquid lubricant layer 17 of perfluoropolyether 2 nm thick was formed by a dip-coating method to produce perpendicular magnetic recording medium 1. No substrate heating was conducted before any deposition step. Neither heating during deposition process of the magnetic recording layer nor heating and followed fast cooling after deposition process of the magnetic recording layer was conducted, as well.

The thus produced perpendicular magnetic recording medium was placed in a high temperature and humidity environment of 85° C. and 80% RH for 96 hours. The medium was then shaken in 50 ml of pure water to solve out and extract cobalt. Concentration of the extracted cobalt was measured by ICP (inductively coupled plasma) emission spectroscopic analysis. Magnetization curve of the medium after deposition of the first and second magnetic layers was measured by a vibrating sample magnetometer to evaluate magnetic properties of the medium. Electromagnetic conversion characteristics of the medium after complete deposition of all layers was measured by a spinning stand tester equipped with a GMR head.

Table 1 is a summary of amounts of cobalt precipitation of perpendicular magnetic recording media produced in various sputtering gas pressures in the process of depositing the first and second magnetic layers.

TABLE 1

Amount of cobalt precipitation [ng/cm$^2$]

| | | sputtering gas pressure for second magnetic layer (mTorr) | | | | |
|---|---|---|---|---|---|---|
| | | 5 | 10 | 15 | 20 | 50 |
| sputtering gas pressure for first magnetic layer (mTorr) | 5 | 0.12 | 0.25 | 0.34 | 0.94 | 2.69 |
| | 10 | 0.23 | 0.36 | 0.44 | 1.08 | 3.52 |
| | 15 | 0.31 | 0.62 | 0.67 | 1.32 | 4.26 |
| | 20 | 0.58 | 0.78 | 0.87 | 1.54 | 5.81 |
| | 50 | 0.76 | 0.89 | 0.92 | 1.84 | 6.53 |
| | 100 | 0.87 | 0.95 | 0.98 | 2.13 | 8.97 |

As is apparent in the Table 1, the cobalt precipitation can be suppressed by decreasing gas pressure in the deposition process of the first magnetic layer, and also by decreasing gas pressure in the deposition process of the second magnetic layer. When the gas pressure in the deposition process of the second magnetic layer is 15 mTorr or lower, the amount of cobalt precipitation is suppressed to a value lower than 1 ng/cm$^2$ independent of the gas pressure in the deposition process of the first magnetic layer.

Table 2 is a summary of SNR of electromagnetic conversion characteristics at 350 kFCI measured on perpendicular magnetic recording media produced in various sputtering gas pressures in the process of depositing the first and second magnetic layers.

TABLE 2

SNR (dB)

| | | sputtering gas pressure for second magnetic layer (mTorr) | | | | |
|---|---|---|---|---|---|---|
| | | 5 | 10 | 15 | 20 | 50 |
| sputtering gas pressure for first magnetic layer (mTorr) | 5 | 14.6 | 14.3 | 14.1 | 13.5 | 12.1 |
| | 10 | 15.2 | 15.1 | 15.0 | 13.9 | 12.5 |
| | 15 | 16.3 | 16.1 | 15.5 | 15.2 | 15.1 |
| | 20 | 16.7 | 16.4 | 15.7 | 15.3 | 15.2 |
| | 50 | 17.1 | 16.8 | 16.0 | 15.6 | 15.4 |
| | 100 | 18.3 | 17.2 | 16.9 | 16.1 | 15.8 |

As apparent in Table 2, favorable SNR of 15 dB or higher was obtained when the gas pressure in the deposition process of the first magnetic layer is 15 mTorr or higher independent of the gas pressure in the deposition process of the second magnetic layer. In the range of 15 mTorr or lower of the gas pressure in the deposition process of the second magnetic layer, SNR value of 15 dB or higher was obtained in the medium produced in the gas pressure of 10 mTorr or higher in the deposition process of the first magnetic layer.

Thus, in order to suppress amount of cobalt precipitation less than 1 ng/cm$^2$ and to obtain SNR value of 15 dB or higher at a recording density of 350 kFCI, required gas pressure conditions are 10 mTorr or higher in the deposition process of the first magnetic layer and 15 mTorr or lower in the deposition process of the second magnetic layer.

EXAMPLE 2

Heat treatment after deposition process of the magnetic recording layer is conducted in Example 2. Magnetic recording media of Example 2 were produced in the same manner as in Example 1 except that substrate heating before deposition (pre-heating), and heating after deposition of the second magnetic layer (post heating) and subsequent fast cooling were conducted in one apparatus. Gas pressures in the deposition process were 50 mTorr for the first magnetic layer and 5 mTorr for the second magnetic layer, and not varied throughout the media of Example 2.

Preheating temperature was 200° C. and post heating temperature was 200° C. Fast cooling step subsequent to the post heating was adjusted so that the substrate temperature cooled down to 100° C. in 10 sec. Coercivity Hc and SNR were measured on media with or without each of the three heat treatment steps. Table 3 summarizes the results.

TABLE 3

| pre-heating | post heating | fast cooling | Hc (Oe) | SNR at 350 kFCI (dB) |
|---|---|---|---|---|
| none | none | none | 3,500 | 17.1 |
| none | done | none | 4,300 | 19.3 |
| none | done | done | 4,500 | 20.8 |
| done | none | none | 820 | 8.3 |
| done | done | none | 1,250 | 10.5 |
| done | done | done | 1,300 | 10.8 |

As apparent in Table 3, preheating abruptly decreases coercivity and SNR. Thus, deposition of the first magnetic layer, which is a granular magnetic layer, needs to be conducted without pre-heating. Post-heating remarkably increases coercivity and SNR. This is because the post-heating improves quality of the second magnetic film, which is a CoCr alloy crystalline film. Fast cooling subsequent to the post-heating further enhances coercivity and SNR.

EXAMPLE 3

Magnetic recording media were produced in the same manner as in Example 1 except that intermediate layer 14 with a thickness of 30 nm was formed of various materials. Gas pressures in deposition processes were 50 mTorr for the first magnetic layer and 5 mTorr for the second magnetic layer, and not changed throughout the media of Example 3. Table 4 summarizes half width $\Delta\theta_{50}$ of a rocking curve of hcp (002) diffraction line of the magnetic recording layer measured by X-ray diffraction. Table 4 includes the cases of intermediate layers formed of tantalum and chromium both having a bcc structure for comparison.

TABLE 4

| intermediate layer material | intermediate layer crystal structure | $\Delta\theta_{50}$ (deg) |
|---|---|---|
| Ru | hcp | 5.0 |
| Re | | 5.6 |
| Os | | 6.5 |
| Ti | | 8.1 |
| Ru-20% W | | 4.9 |
| Ti-10% Cr | | 7.5 |
| Ta | bcc | 25.0 |
| Cr | | 20.4 |

Table 4 indicates improvement of $\Delta\theta_{50}$ by the intermediate layers composed of materials having an hcp structure as compared with the intermediate layer of tantalum and chromium having a bcc structure, demonstrating effective crystal orientation control of the magnetic layer by the intermediate layer of hcp materials.

EXAMPLE 4

Magnetic recording media of Example 4 are provided with underlayer 62 and magnetic domain control layer 63 shown in FIG. 2, and lack seed layer 65. The magnetic recording media were produced in the same procedure as in Example 1 except that a first underlayer of tantalum 5 nm thick using tantalum target, a second underlayer of NiFeCr 5 nm thick using a target of NiFeCr, and magnetic domain control layer 63 of IrMn 10 nm thick were deposited between nonmagnetic substrate 61 and soft magnetic backlining layer 64. Gas pressures in the deposition process were 50 mTorr for the first magnetic layer and 5 mTorr for the second magnetic layer, and not changed throughout the media of Example 4. No difference in coercivity and in SNR was observed between the perpendicular magnetic recording media of Example 4 and the media of Example 1.

Figure 5:
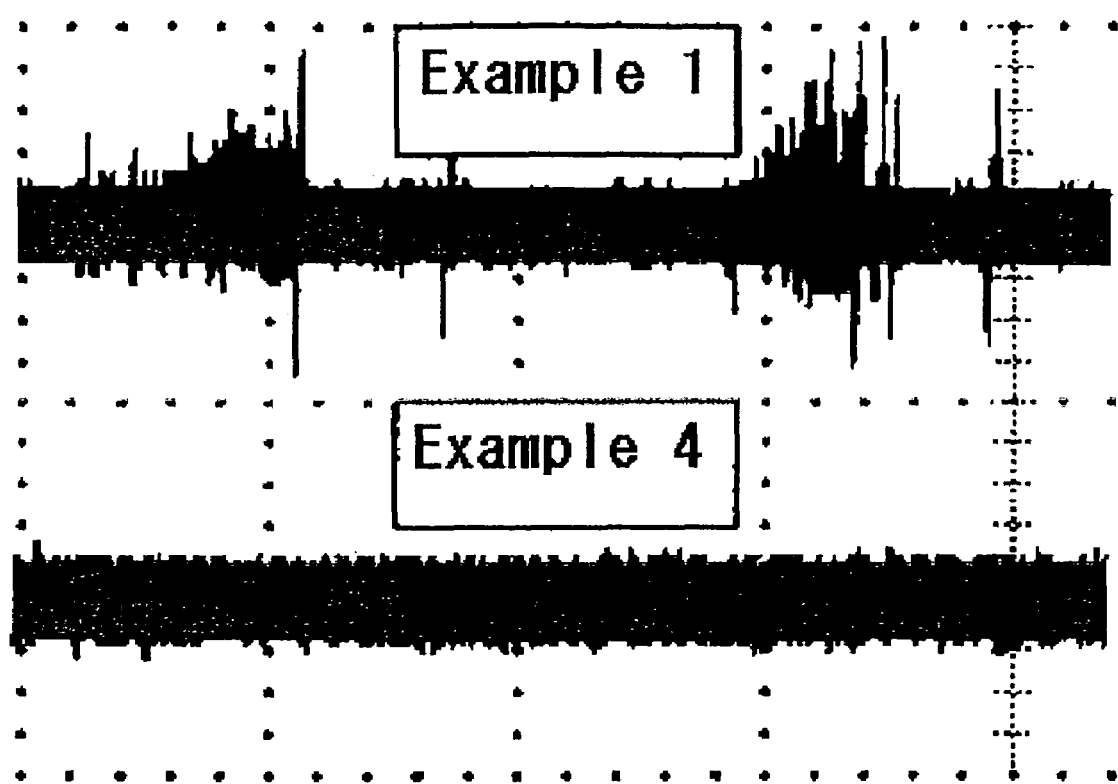
FIG. 5 shows a one rotation output signal from a spinning stand tester measured on a perpendicular magnetic recording medium.

FIG. 5 shows a one rotation output signal from a spinning stand tester on perpendicular magnetic recording media manufactured in Example 1 and in Example 4. A perpendicular magnetic recording medium of Example 1 that lacks an underlayer and a magnetic domain control layer generated random spike noises in the whole of one rotation, whereas provision of the underlayer and the magnetic domain control layer significantly reduced the spike noises, as shown in FIG. 5. The result indicates that the provision of the underlayer and the magnetic domain control layer prevents a subsequently laminated soft magnetic layer from generation of magnetic domain walls.

EXAMPLE 5 ("EX 5")

Perpendicular magnetic recording media in Example 5 were subjected to heat treatment during the process to form the magnetic recording layer. Structure of the examples is as shown in FIG. 1.

Figure 6:
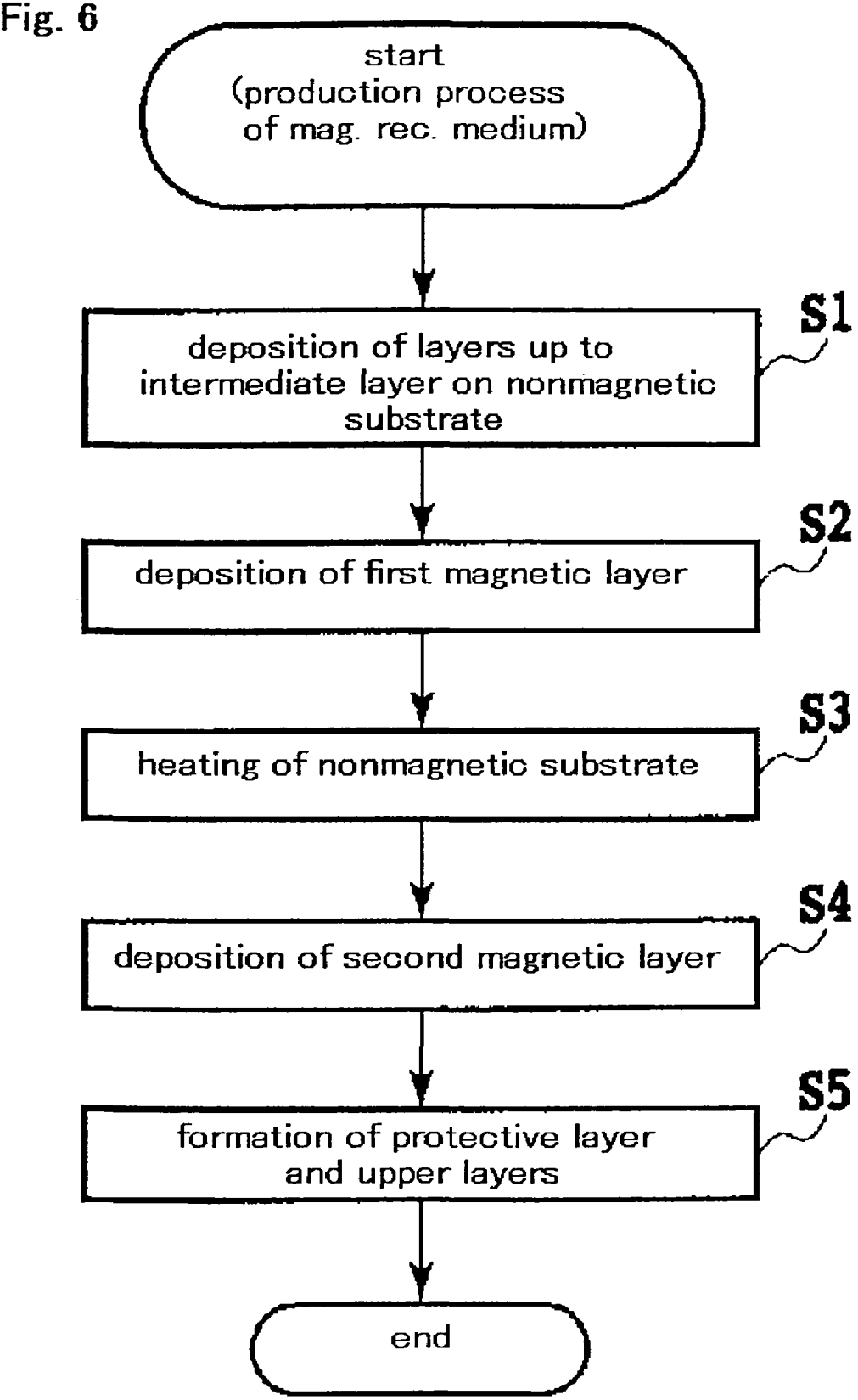
FIG. 6 is a flow chart showing a manufacturing method including an intermediate heating step for a perpendicular magnetic recording medium according to the present invention.

FIG. 6 is a flow chart showing a manufacturing method of perpendicular magnetic recording media of Example 5. In step S1, layers up to an intermediate layer 14 are sequentially formed on nonmagnetic substrate 11. A chemically reinforced glass substrate with a smooth surface (for example, N-5 glass substrate manufactured by HOYA Corporation) is used for nonmagnetic substrate 11. After cleaning, the substrate is put into a sputtering apparatus. Soft magnetic backlining layer 12 of CoZrNb 150 nm thick is formed using a target of $CO_{88}Zr_4Nb_8$ under argon gas pressure of 5 mTorr on the substrate. Subsequently, seed layer 13 of NiFeSiB 10 nm thick is formed using a target of a soft magnetic nickel-based alloy of $Ni_{84}Fe_{12}Si_3B_1$ under argon gas pressure of 20 mTorr. On the seed layer, ruthenium intermediate layer 14 with a thickness of 10 nm is formed using a ruthenium target under argon gas pressure of 30 mTorr.

In step S2, first magnetic layer 151 that is a part of a magnetic recording layer 15 is formed. Magnetic layer 151 of CoPtCr—$SiO_2$ shown in FIG. 3 having thickness of 8 nm is formed by means of an RF sputtering method using a target of $(CO_{72}Pt_{18}Cr_{10})_{93}(SiO_2)_7$ under argon gas pressure of 30 mTorr.

In step S3, nonmagnetic substrate 11 having magnetic layer 151 of CoPtCr—$SiO_2$ formed thereon is subjected to heat treatment, which is refereed to as intermediate heating. The intermediate heating is conducted by a lamp heater in a heating chamber at a substrate temperature of 200° C. for 10 sec.

In step S4, after the intermediate heating, second magnetic layer 152 which forms a part of magnetic recording layer 15 is formed. Second magnetic layer 152 of CoCrPtB as shown in FIG. 4 having a thickness of 6 nm is formed, on the heat-treated first magnetic layer of CoPtCr—$SiO_2$, using a target of $CO_{66}Cr_{20}Pt_{10}B_4$ under argon gas pressure of 5 mTorr.

In step S5, layers from protective layer 16 and above are sequentially formed. Carbon protective layer 16 with a thickness of 3 nm is deposited by an ion beam deposition method. After that, the substrate is taken out from the vacuum chamber. Liquid lubricant layer 17 of perfluoropolyether 2 nm thick is formed by dip-coating method. Thus, a perpendicular magnetic recording medium 1 is produced. The deposition steps of the above described layers were conducted by a DC magnetron sputtering method except for deposition steps of first magnetic layer 151 and of protective layer 16.

In evaluation of Example 5, comparison was made with Comparative Examples 1 through 4 that were produced as follows.

Comparative Example 1 ("CEx 1")

A perpendicular magnetic recording medium of Comparative Example 1 was produced in the same manner as in Example 5 except that heating after deposition of a first magnetic layer of CoPtCr—$SiO_2$ was not conducted and the second magnetic layer CoCrPtB as in Example 1 was not formed.

Comparative Example 2 ("CEx 2")

A perpendicular magnetic recording medium of Comparative Examples 2 was produced in the same manner as in Comparative Example 1 except that a thickness of the first magnetic layer of CoPtCr—SiO$_2$ was 14 nm.

sample in 50 ml of pure water for 3 minutes to extract the solved out cobalt, and measuring the concentration by means of ICP emission spectroscopic analysis.

Though Table 5 gives the SNR values at a recording density of 367 kFCI as an example, it has been confirmed that order of superiority does not change at other recording densities.

TABLE 5

| | Structure of magnetic recording layer and heating process | | | | Electro-magnetic characteristics SNR at 367 kFCI (dB) | ICP evaluation Amount of cobalt precipitation (ng/cm$^2$) |
|---|---|---|---|---|---|---|
| | Thickness of CoPtCr—SiO$_2$ first magnetic layer (nm) | Intermediate heating | Thickness of CoCrPtB second magnetic layer (nm) | Post heating | | |
| Ex 5 | 8 | Done | 6 | None | 15.06 | 0.074 |
| CEx 1 | 8 | None | 0 | None | 13.42 | 0.625 |
| CEx 2 | 14 | None | 0 | None | 13.56 | 0.684 |
| CEx 3 | 8 | None | 6 | None | 12.80 | 0.216 |
| CEx 4 | 8 | None | 6 | Done | 13.93 | 0.213 |

Comparative Example 3 ("CEx 3")

A perpendicular magnetic recording medium of Comparative Example 3 was produced in the same manner as in Example 5 except that no heating was conducted after deposition of the first magnetic layer of CoPtCr—SiO$_2$.

Comparative Example 4 ("CEx 4")

A perpendicular magnetic recording medium of Comparative Example 4 was produced in the same manner as in Example 5 except that no intermediate heating was conducted after deposition of first magnetic layer 151 of CoPtCr—SiO$_2$, and a second magnetic layer of CoCrPtB was laminated, subsequently carrying out heating (post heating).

Conditions for the post heating were 200° C. and 10 seconds, which were the same as the intermediate heating after deposition of first magnetic layer 151 of CoPtCr—SiO$_2$ and before deposition of second magnetic layer 152 of CoCrPtB conducted in Example 5.

The thus produced five types of perpendicular magnetic recording media were characterized by electromagnetic conversion characteristic in view of recording density and ICP analysis of amount of cobalt precipitation from the magnetic recording layer in view of corrosion resistance. The results are given in Table 5, which also shows thickness and heating process for magnetic recording layer 15.

For evaluation of electromagnetic conversion characteristic, SNR was measured by a spinning stand tester equipped with a GMR head. The GMR head was different from the one used in the evaluation conducted in Example 1 through 4. Therefore, straight comparison of the SNR value between Table 5 and Table 2 to 3 is not favorable.

Measurement of amount of cobalt precipitation was carried out by placing a sample in a high temperature and humidity environment of a temperature of 85° C. and relative humidity of 80% for 96 hours, then shaking the First, a comparison is made between Comparative Example 1 and Comparative Example 3. No heating was conducted in either Comparative Example 1 or 3. Comparative Example 1 resulted in SN of 13.42 dB and an amount of cobalt precipitation of 0.625 ng/cm$^2$, and in Comparative Example 3, SNR of 12.80 dB and an amount of cobalt precipitation of 0.216 ng/cm$^2$. Comparative Example 3 suppressed the amount of cobalt precipitation to about one third, though exhibiting lower SNR by 0.6 dB. As this comparison indicates, cobalt precipitation is remarkably suppressed by laminating second magnetic layer 152 of CoCrPtB that comprises grain boundary region 31 mainly composed of chromium and precipitates less cobalt than first magnetic layer 151 of CoPtCr—SiO$_2$ that comprises grain boundary region 21 mainly composed of an oxide SiO$_2$. However, noises are greater and SNR are worse in Comparative Example 3 because intergranular magnetic interaction is relatively larger in the second magnetic layer 152 of CoCrPtB.

Total thicknesses of magnetic recording layers 15 in Comparative Examples 1 and 3 are different: 8 nm in Comparative Example 1 and 14 nm in Comparative Example 3. To confirm that the difference in SNR and cobalt precipitation is not simply due to an effect of difference in film thickness, Example 2 was prepared having a thickness 14 nm of first magnetic layer 151 of CoPtCr—SiO$_2$.

Comparative Example 2 resulted in SNR of 13.56 dB and an amount of cobalt precipitation of 0.684 ng/cm$^2$. No heating was conducted in Comparative Example 2. Comparing Comparative Example 2 with Comparative Example 1, SNR improved by about 0.1 dB and cobalt precipitation increased by 0.06 ng/cm$^2$. Comparing with Comparative Example 3, cobalt precipitation increased to about 3 times as large value though SNR improved by 0.8 dB.

This tendency is equivalent to the comparison between Comparative Examples 1 and 3. Thus, the degradation of SNR and the improvement in cobalt precipitation by laminating a second magnetic layer 152 of CoCrPtB on first magnetic layer 151 of CoPtCr—SiO$_2$ are certainly not simply due to an effect of film thickness.

Next, a comparison is made between Comparative Examples 3 and 4. Comparative Example 4 resulted in SNR of 13.93 dB and an amount of cobalt precipitation of 0.213 ng/cm². Post heating was conducted in Comparative Example 4. Comparative Example 4, which was heated after deposition of second magnetic layer 152 of CoCrPtB, improved SNR by 1.1 dB, while the difference in amount of cobalt precipitation was 0.003 ng/cm² and substantially equivalent.

The improvement in SNR indicates that the post heating promotes chromium segregation to the grain boundary region in the CoCrPtB layer and reduces intergranular magnetic interaction. The substantially equivalent cobalt precipitation indicates that the heating does not change quality of protective layer 16 and thus, does not alter cobalt precipitation.

Finally, a comparison is made between Example 5 and Comparative Example 4. Example 5 resulted in SNR of 15.06 dB and an amount of cobalt precipitation of 0.074 ng/cm². An intermediate heating was conducted in Example 5. Example 5 improved SNR by 1.1 dB and suppressed the cobalt precipitation to a very small value of 0.074 ng/cm², which is about one third of that in Comparative Example 4. The result can be attributed to the intermediate heating conducted between the deposition steps of first magnetic layer 151 of CoPtCr—SiO₂ and second magnetic layer 152 of CoCrPtB. This intermediate heating is precedent heating to deposition of the second magnetic layer of CoCrPtB. It has been demonstrated that the precedent heating more promotes chromium segregation and at the same time, more suppresses cobalt precipitation than the post heating.

The following describes the benefits of the intermediate heating of a magnetic recording layer consisting of first and second magnetic layers 151 and 152. The intermediate heating produces distinctive features in structure.

Figure 7:
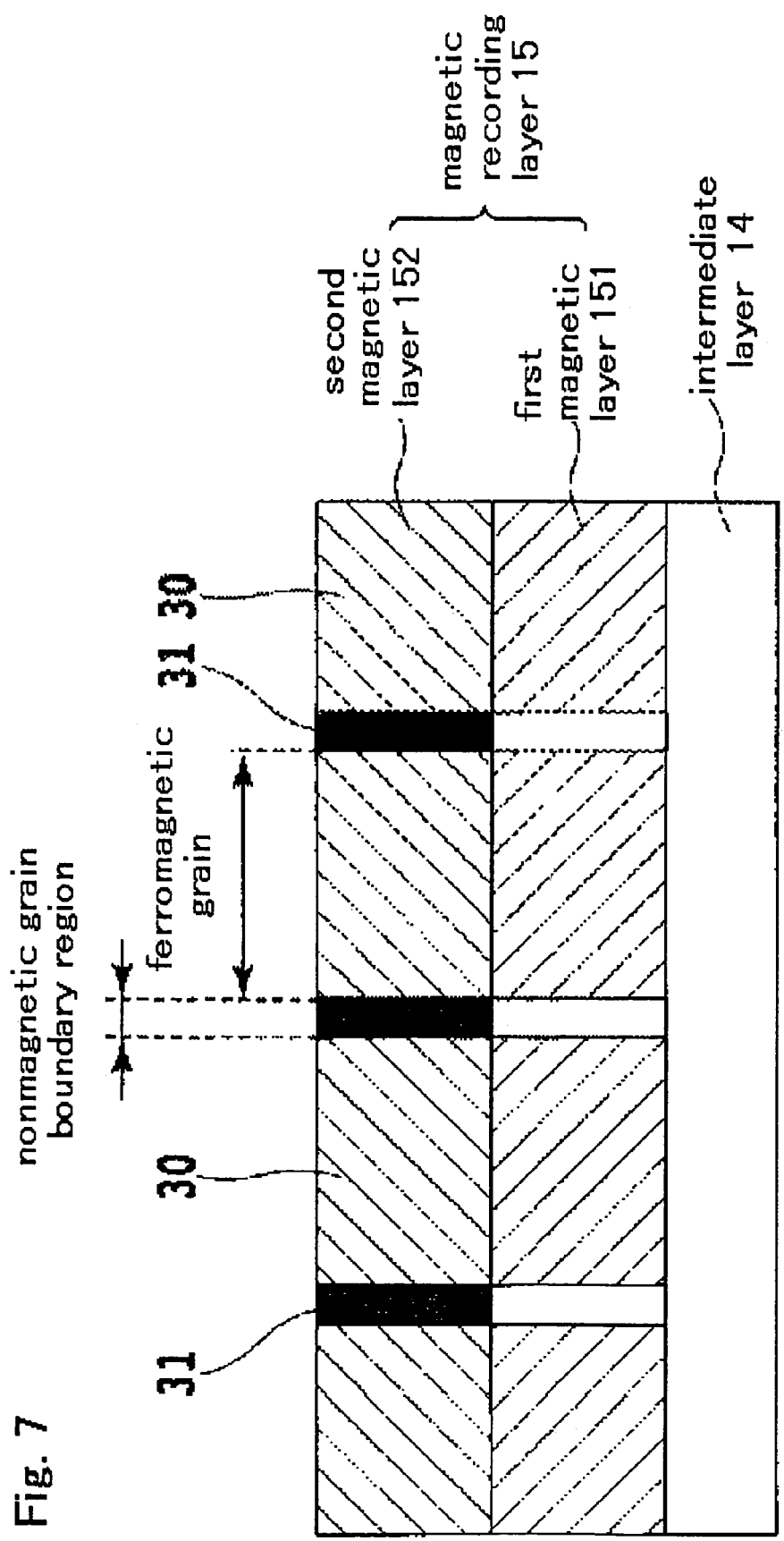
FIG. 7 is a sectional view showing a structure of a magnetic recording layer formed by a manufacturing method including an intermediate heating step.
Figure 8:
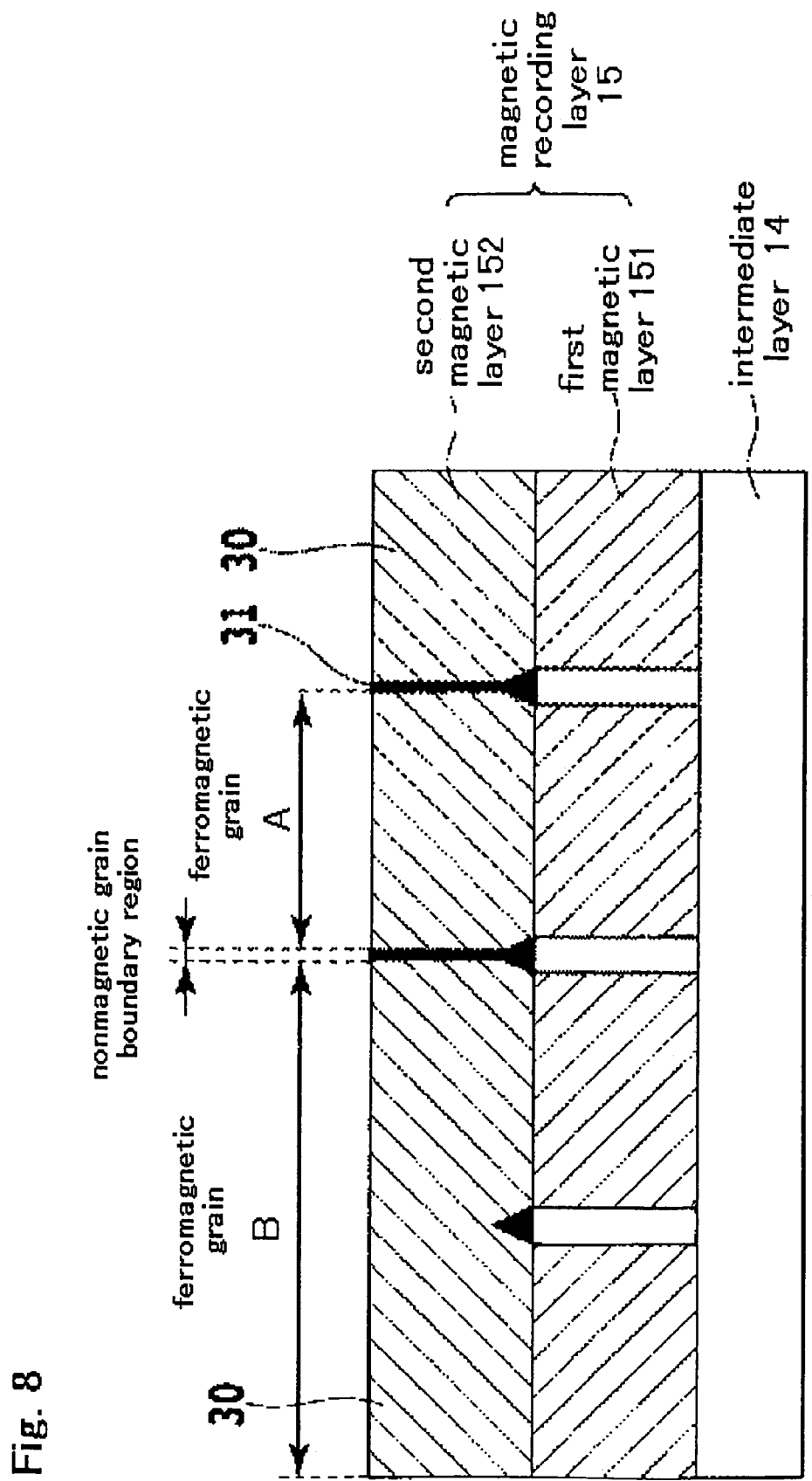
FIG. 8 is a sectional view showing a structure of a magnetic recording layer formed by a manufacturing method without an intermediate heating step.

FIG. 7 shows a sectional structure of magnetic recording layer 15 of an example of embodiment according to the invention. Intermediate heating is carried out in the example. FIG. 8 shows a sectional structure of magnetic recording layer 15 in the case without intermediate heating for comparison.

The positional relationship between the upper and lower layers of magnetic recording layer 15 in FIG. 7 is basically such that every crystalline grain in second magnetic layer 152 positions on a crystalline grain in first magnetic layer 151, and every grain boundary in second magnetic layer 152 positions on grain boundary in first magnetic layer 151. In a magnetic layer with intermediate heating as shown in FIG. 7, second magnetic layer 152 grows directly reflecting the grain size and the grain boundary width in first magnetic layer 151. In contrast, in the case without intermediate heating as shown in FIG. 8, while second magnetic layer 152 grows reflecting grain size and grain boundary width in the vicinity of interface with first magnetic layer 151, as the growth proceeds, the grain boundary width narrows and the grain size enlarges. The ferromagnetic crystalline grain A in FIG. 8, for example, swells corresponding to shrinkage of the surrounding grain boundary region. The ferromagnetic grain B in FIG. 8 enlarges (doubles) joining with a neighboring grain together. Thus, in the case without intermediate heating, the mean grain size increases and the mean grain boundary width decreases.

In magnetic recording layer 15 of the example as shown in FIG. 7, a mean grain boundary width is in a range of 0.5 to 2.0 nm and a mean grain size is in a range of 4 to 12 nm. The grain size and crystallinity can be determined depending on the composition of magnetic recording layer 15, additives to magnetic recording layer 15, deposition process of magnetic recording layer 15, and grain size and grain boundary structure of intermediate layer 14.

In second magnetic layer 152 without intermediate heating as shown in FIG. 8, mean grain boundary width is smaller and mean grain size is larger than those described above for the case with intermediate heating. In a specific example with intermediate heating, mean grain boundary width of 1.1 nm and mean grain size of 7.3 nm, while in an example without intermediate heating in which conditions other than the intermediate heating are the same, mean grain boundary width of 0.7 nm and mean grain size of 9.5 nm.

In the magnetic recording layer with the structure shown in FIG. 7, control of grain size and crystallinity can be carried out by selecting additive element to the ferromagnetic crystalline grains, as described below. In first magnetic layer 151, grain size can be made fine and intergranular magnetic interaction can be reduced by adding at least an element selected from Ta, B, Nb, Mo, W, and Cr. In first magnetic layer 151, crystallinity can be enhanced and crystalline magnetic anisotropy constant Ku can be elevated by adding at least an element selected from Ag, Pd, and Cu.

In second magnetic layer 152, grain size can be made fine and intergranular magnetic interaction can be reduced by adding at least an element selected from Ta, B, Nb, Mo, and W. In second magnetic layer 152, crystallinity can be enhanced and crystalline magnetic anisotropy constant Ku can be elevated by adding at least an element selected from Ag, Pd, Cu, and Pt.

Intermediate heating according to the invention produces several beneficial effects. For example, second magnetic layer 152 in the structure of a magnetic recording layer 15 shown in FIG. 7 grows while retaining the same grain size and grain boundary width as in first magnetic layer 151, and this facilitates favorable chromium segregation. As a result, SNR enhances according to the following reasoning. Since the same grain size and grain boundary width are maintained, the physical distance between the magnetic grains is large, so that intergranular magnetic interaction reduces, which decreases magnetic cluster size (described later). This, in turn, decreases width of a transition region between bits, which results in a reduction in bit transition noise.

Because of favorable chromium segregation, the cobalt proportion in the ferromagnetic grains increases. This increases magnetic flux density in each crystalline grain, which increases output signal. The favorable chromium segregation, on the other hand, causes a small cobalt proportion in the nonmagnetic grain boundary region, which reduces magnetic interaction. This, in turn, decreases magnetic cluster size, which reduces bit transition noise.

In magnetic recording layer 15 in the structure shown in FIG. 7, if every grain independently makes inversion of magnetization, it is an ideal state in which no magnetic interaction exists between the grains. In actual, however, magnetic interaction acts between the grains. As a result, several grains or more form a magnetization inversion unit. Such a group of the grains is called a magnetic cluster. Reduction of the size of the magnetic cluster reduces noises and raises SNR.

In contrast, a magnetic recording layer in the structure shown in FIG. 8, in a case in which intermediate heating is not conducted, but post heating after deposition of second magnetic layer 152 is conducted, as in the case of Comparative Example 4 in Table 5, grain sizes of first magnetic layer 151 and others may be made uniform in some degree and chromium segregation in second magnetic layer 152 may occur. But, they can occur to a limited extent.

Because a course of growing process of the second magnetic layer 152 is similar to the case with no heating, as Comparative Example 3 in Table 5, the physical distance between the grains is small and thus, a size of magnetic clusters increases, resulting in degradation in SNR. As such, by conducting the intermediate heating as in the examples of embodiment of the invention, a magnetic cluster size as a whole in magnetic recording layer 15 is decreased, and this enables low noise and improved SNR.

The benefits of the intermediate heating described above are summarized in the following. First, by subjecting first magnetic layer 151 to intermediate heating, deviation in grain size is decreased and the grain sizes are made uniform. In this stage, mean grain size and mean grain boundary width remain almost unchanged. Second, if second magnetic layer 152 is formed on first magnetic layer 151 without heating, the grain size increases and the grain boundary width decreases in the second magnetic layer with increase of film thickness of the second magnetic layer. In contrast, when second magnetic layer 152 is formed after intermediate heating according to the invention, the increase in grain size and the decrease in grain boundary width are suppressed, and second magnetic layer 152 grows following the grain size and the grain boundary width of first magnetic layer 151. Third, in second magnetic layer 152 formed after intermediate heating, chromium segregation to nonmagnetic grain boundary region 31 is promoted as shown in FIG. 4, and nonmagnetic grain boundary region 31 becomes more chromium-rich than ferromagnetic crystalline grain 30. Consequently, a layer of a CoCr alloy, a CoCrPt alloy, or CoCrPtB alloy is allowed to be employed for ferromagnetic grains of second magnetic layer 152. Fourth, a surface of second magnetic layer 152 after the intermediate heating exhibits better flatness than a post-heated surface.

In summary, the intermediate heating:

[1] makes grain sizes uniform,

[2] suppresses increase in grain sizes in second magnetic layer 152,

[3] promotes chromium segregation in second magnetic layer 152,

[4] allows employing CoCr, CoCrPt, or CoCrPtB in second magnetic layer 152, and

[5] improves flatness of the surface of second magnetic layer 152.

The effects [1], [2], and [3] lead to enhancement of output signal and reduction of noises simultaneously, which means improvement in SNR of an evaluation of electromagnetic conversion characteristics, achieving high recording density. Recording density is determined by characterizing BER (bit error rate). A high BER means read out at that recording density impossible. A threshold value of BER depends on a signal processing circuit. For example, a certain signal processing circuit correctly reads out data at a BER of $10^{-5}$ or less, while another circuit only permits a BER of $10^{-6}$ or less. The BER is generally improved with increase of SNR. Therefore, enhancement in SNR also is an index for improvement of recording density in the present invention. For example, an enhancement in SNR by 1 dB is equivalent to improvement of BER of one to one and a half orders of magnitude, and an enhancement in SNR by 2 dB is equivalent to improvement of BER of two to three orders of magnitude.

The effects [4] and [5] indicated above increases coverage with protective layer 16, which reduces cobalt precipitation by ICP characterization, which means high resistance to corrosion. Therefore, high reliability can be achieved.

As described so far, a perpendicular magnetic recording medium manufactured by a method comprising a process to heat nonmagnetic substrate 11 with a deposited first magnetic layer before a step of forming a second magnetic layer according to the invention achieves higher SNR than a type of magnetic recording medium with post heating (as Comparative Example 4). At the same time, a magnetic recording medium of the invention drastically suppresses cobalt precipitation from magnetic recording layer 15 in comparison with a type of magnetic recording medium without post heating (as Comparative Example 1 through 3). Therefore, a perpendicular magnetic recording medium is provided that achieves high recording density by virtue of improvement in electromagnetic conversion characteristic and simultaneously high reliability by virtue of improvement in corrosion resistance.

Thus, an improved perpendicular magnetic recording medium has been described according to the present invention. Many modifications and variations may be made to the techniques and structures described and illustrated herein without departing from the spirit and scope of the invention. Accordingly, it should be understood that the media and methods described herein are illustrative only and are not limiting upon the scope of the invention.

What is claimed is:

1. A perpendicular magnetic recording medium comprising:
    a nonmagnetic substrate;
    an intermediate layer laminated over the substrate;
    a magnetic recording layer comprising a first magnetic layer formed on the intermediate layer, the first magnetic layer including ferromagnetic grains and nonmagnetic grain boundary region containing oxide and/or nitride, and a second magnetic layer formed on the first magnetic layer, the second magnetic layer including ferromagnetic grains and nonmagnetic grain boundary region lacking oxide and nitride; and
    a protective layer formed on the second magnetic layer,
    wherein the mean grain size of the first and second magnetic layers is the same and the mean width of the grain boundary region in the first and second magnetic layers is the same.

2. The perpendicular magnetic recording medium according to claim 1, wherein the ferromagnetic grains in the first magnetic layer contain cobalt as a principal component, and platinum or chromium, and the nonmagnetic grain boundary region in the first magnetic layer is substantially composed of oxide and/or nitride of at least an element selected from Cr, Co, Al, Ti, Si, Ta, Hf, Zr, Y, and Ce.

3. The perpendicular magnetic recording medium according to claim 2, wherein the ferromagnetic grains in the first magnetic layer further contain at least an element selected from Ni, Ta, B, Nb, Ag, Mo, W, Pd, and Cu.

4. The perpendicular magnetic recording medium according to claim 1, wherein a concentration of each of non-ferromagnetic components in the nonmagnetic grain boundary region in the second magnetic layer is higher than a concentration of the same non-ferromagnetic component in the ferromagnetic grains in the second magnetic layer.

5. The perpendicular magnetic recording medium according to claim 1, wherein the ferromagnetic grains in the second magnetic layer contain a CoCr alloy as a principal component and at least an element selected from Pt, Ta, B, Nb, Ag, Mo, W, Pd, and Cu; and the nonmagnetic grain boundary region contains at least chromium in a concentration that is higher than a concentration of chromium contained in the ferromagnetic grains in the second magnetic layer.

6. The perpendicular magnetic recording medium according to claim 1, wherein the intermediate layer is composed of an element having a hexagonal closest packed (hcp) structure selected from Ti, Re, Ru, Os, Zr, Zn, and Tc, or an alloy having the hcp structure containing at least an element selected from Ti, Re, Ru, Os, Zr, Zn, and Tc.

7. The perpendicular magnetic recording medium according to claim 1, wherein the intermediate layer is composed of an element having a face centered cubic (fcc) structure selected from Cu, Rh, Pd, Ag, Ir, Pt, Au, Ni, and Co, or an alloy having the fcc structure containing at least an element selected from Cu, Rh, Pd, Ag, Ir, Pt, Au, Ni, and Co.

8. The perpendicular magnetic recording medium according to claim 1 further comprising a seed layer beneath the intermediate layer.

9. The perpendicular magnetic recording medium according to claim 8, wherein the seed layer is composed of either (i) a NiFe alloy or (ii) a NiFe alloy containing at least an additive element selected from B, Si, Nb, and Mo.

10. The perpendicular magnetic recording medium according to claim 8, wherein the seed layer is composed of either (i) cobalt or (ii) a cobalt alloy containing at least an additive element selected from B, Si, Nb, Mo, Fe, and Ni.

11. The perpendicular magnetic recording medium according to claim 8, further comprising a soft magnetic backlining layer between the substrate and the seed layer.

12. The perpendicular magnetic recording medium according to claim 11, further comprising an underlayer deposited on the substrate and a magnetic domain control layer deposited on the underlayer.

13. The perpendicular magnetic recording medium according to claim 1, further comprising a soft magnetic backlining layer between the substrate and the intermediate layer.

14. The perpendicular magnetic recording medium according to claim 13, further comprising an underlayer deposited on the substrate and a magnetic domain control layer deposited on the underlayer.

15. The perpendicular magnetic recording medium according to claim 1, wherein the second magnetic layer is formed after a heat treatment of the substrate having the first magnetic layer formed thereon.

16. A method for manufacturing a perpendicular magnetic recording medium comprising:
preparing a nonmagnetic substrate without preheating process;
depositing an intermediate layer on the substrate;
depositing a first magnetic layer on the intermediate layer by a sputtering method, the first magnetic layer comprising ferromagnetic grains and nonmagnetic grain boundary region including oxide and/or nitride;
depositing a second magnetic layer on the first magnetic layer by a sputtering method, the second magnetic layer including ferromagnetic grains and nonmagnetic grain boundary region lacking oxide and nitride, wherein the mean grain size of the first and second magnetic layers is the same and the mean width of the grain boundary region in the first and second magnetic layers is the same; and
depositing a protective layer on the second magnetic layer; wherein a gas pressure during deposition of the first magnetic layer is 10 mTorr or more, and a gas pressure during deposition of the second magnetic layer is 15 mTorr or less.

17. The method for manufacturing a perpendicular magnetic recording medium according to claim 16, further comprising heating the substrate after depositing the second magnetic layer in a deposition apparatus.

18. The method for manufacturing a perpendicular magnetic recording medium according to claim 17, further comprising fast cooling the substrate in the deposition apparatus after heating.

19. The method for manufacturing a perpendicular magnetic recording medium according to claim 16, further comprising depositing a seed layer on the substrate without heating process before depositing the intermediate layer.

20. The method for manufacturing a perpendicular magnetic recording medium according to claim 16, further comprising depositing an underlayer on the substrate, depositing a magnetic domain control layer on the underlayer, and depositing a soft magnetic backlining layer on the magnetic domain control layer.

21. A method for manufacturing a perpendicular magnetic recording medium comprising:
preparing a nonmagnetic substrate without preheating process;
depositing an intermediate layer on the substrate;
depositing a first magnetic layer on the intermediate layer by a sputtering method, the first magnetic layer including ferromagnetic grains and nonmagnetic grain boundary region containing oxide and/or nitride;
heating the substrate having the first magnetic layer formed thereon;
depositing a second magnetic layer on the first magnetic layer by a sputtering method, the second magnetic layer including ferromagnetic grains and nonmagnetic grain boundary region lacking oxide and nitride,
wherein the mean grain size of the first and second magnetic layers is the same and the mean width of the grain boundary region in the first and second magnetic layers is the same; and
depositing a protective layer on the second magnetic layer.

22. The method for manufacturing a perpendicular magnetic recording medium according to claim 21, further comprising depositing a seed layer right before depositing the intermediate layer.

23. The method for manufacturing a perpendicular magnetic recording medium according to claim 21, further comprising depositing an underlayer on the substrate, depositing a magnetic domain control layer on the underlayer, and depositing a soft magnetic backlining layer on the magnetic domain control layer.

* * * * *